US012771237B2

(12) United States Patent
Hamanaka et al.

(10) Patent No.: US 12,771,237 B2
(45) Date of Patent: Oct. 20, 2026

(54) POWER CONVERSION DEVICE

(71) Applicant: Mitsubishi Electric Corporation, Tokyo (JP)

(72) Inventors: Kota Hamanaka, Chiyoda-ku (JP); Ryosuke Uda, Chiyoda-ku (JP); Kaho Mukunoki, Chiyoda-ku (JP); Toshiyuki Fujii, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 152 days.

(21) Appl. No.: 18/865,758

(22) PCT Filed: Jun. 10, 2022

(86) PCT No.: PCT/JP2022/023461

§ 371 (c)(1),
(2) Date: Nov. 14, 2024

(87) PCT Pub. No.: WO2023/238386

PCT Pub. Date: Dec. 14, 2023

(65) Prior Publication Data

US 2025/0149975 A1 May 8, 2025

(51) Int. Cl.
*H02M 1/08* (2006.01)
*H02M 1/00* (2006.01)
*H02M 1/32* (2007.01)

(52) U.S. Cl.
CPC ......... *H02M 1/325* (2021.05); *H02M 1/0009* (2021.05); *H02M 1/0025* (2021.05); *H02M 1/007* (2021.05); *H02M 1/08* (2013.01)

(58) Field of Classification Search
CPC .. H02M 1/325; H02M 1/0009; H02M 1/0025; H02M 1/007; H02M 1/08; H02M 7/4833; H02M 7/4835; H02M 1/32
See application file for complete search history.

(56) References Cited

U.S. PATENT DOCUMENTS

2023/0170822 A1 6/2023 Fujiwara et al.

FOREIGN PATENT DOCUMENTS

JP 2019080476 A 5/2019
JP 6818191 B1 1/2021

(Continued)

OTHER PUBLICATIONS

International Search Report (PCT/ISA/210) with translation and Written Opinion (PCT/ISA/237) mailed on Aug. 23, 2022, by the Japanese Patent Office as the International Searching Authority for International Application No. PCT/JP2022/023461. (9 pages).

*Primary Examiner* — Crystal L Hammond
*Assistant Examiner* — Jonathan Walter Soileau
(74) *Attorney, Agent, or Firm* — .Buchanan Ingersoll & Rooney PC

(57) ABSTRACT

A power conversion device includes: a power converter which includes a plurality of converter cells; and a control device. The control device includes: a phase-balance control unit to generate arm-current command values, based on direct-current voltages of power storage elements of the plurality converter cells; a circulating-current control unit to generate a circulating-voltage command value for controlling a circulating current, based on the arm-current command values; a correction-voltage generation unit to correct a reference-voltage command value, using a correction value for suppressing an overcurrent due to a voltage imbalance of the power system, to generate a correction-voltage command value; a voltage-command calculation unit to generate arm-voltage command values, based on the circulating-voltage command value and the correction-voltage command value; and a gate-signal generation unit to generate control signals for the plurality of switching elements of the at least one arm, according to the arm-voltage command values.

8 Claims, 10 Drawing Sheets

(56) References Cited

FOREIGN PATENT DOCUMENTS

| | | | | | |
|---|---|---|---|---|---|
| JP | 7051028 | B1 | | 3/2022 | |
| WO | WO-2023053173 | A1 | * | 4/2023 | ................ H02J 3/34 |

* cited by examiner

POWER CONVERSION DEVICE

TECHNICAL FIELD

The present disclosure relates to a power conversion device, and a control device.

BACKGROUND ART

In recent years, a large number of distributed power supplies utilizing renewable energy from solar installations are introduced into a power system. A distributed power supply is often connected to a power system via a power converter. Thus, an increase in number of distributed power supplies connected to a power system reduces the percentage of synchronous machines connected to the power system, reducing the inertial energy within the power system. Given these circumstances, a virtual synchronous machine control is proposed, which causes the power converter to behave in a manner similar to the synchronous machine to compensate for the reduced inertial energy.

For example, the alternating-current (AC)-to-direct-current (DC) converter control device according to Japanese Patent Laying-Open No. 2019-80476 (PTL 1) includes: the generator characteristic calculation unit that calculates the synchronous generator characteristics such that the power output from the storage battery has characteristics equivalent to the characteristics of the synchronous generator; and the output current suppression unit that causes the internal impedance of the virtual synchronous generator to vary so that the output current of the AC-to-DC converter does not exceed the current limit value in the event of a short-circuit failure in the power system.

CITATION LIST

Patent Literature

PTL 1: Japanese Patent Laying-Open No. 2019-80476

SUMMARY OF INVENTION

Technical Problem

PTL 1 considers allowing, even in the event of a short-circuit failure in a power system, the power converter, operating as a voltage source, to continue to operate, without protection shutdown being activated by overcurrent. PTL 1, however, fails to teach or suggest any technique to allow the power converter, operating as a voltage source and configured of a modular multilevel converter (MMC), to continue to operate during the system imbalance due to an accident or the like.

An object according to a certain aspect of the present disclosure is to provide a power conversion device and a control device that can improve, during the system imbalance, the operational continuity of an MMC power converter operating as a voltage source.

Solution to Problem

According to a certain embodiment, a power conversion device connected to a power system is provided. The power conversion device includes: a power converter which includes at least one arm having a cascade-connected plurality of converter cells; and a control device to cause the power converter to operate as a voltage source. Each of the plurality of converter cells includes a plurality of switching elements and a power storage element connected to the plurality of switching elements. The control device includes: a phase-balance control unit to generate arm-current command values for respective phases, based on direct-current voltages of power storage elements of the plurality of converter cells; a circulating-current control unit to generate a circulating-voltage command value for controlling a circulating current, based on the arm-current command values for respective phases; a correction-voltage generation unit to correct a reference-voltage command value for the power converter, using a correction value for suppressing an overcurrent due to a voltage imbalance of the power system, to generate a correction-voltage command value; a voltage-command calculation unit to generate arm-voltage command values for respective phases, based on the circulating-voltage command value and the correction-voltage command value; and a gate-signal generation unit to generate control signals for the plurality of switching elements of the plurality of converter cells of the at least one arm, according to the arm-voltage command values for respective phases.

According to another embodiment, a control device for causing a power converter connected to a power system to operate as a voltage source is provided. The power converter includes at least one arm having a cascade-connected plurality of converter cells. Each of the plurality of converter cells includes a plurality of switching elements and a power storage element connected to the plurality of switching elements. The control device includes: a phase-balance control unit to generate arm-current command values for respective phases, based on direct-current voltages of power storage elements of the plurality of converter cells; a circulating-current control unit to generate a circulating-voltage command value for controlling a circulating current, based on the arm-current command values for respective phases; a correction-voltage generation unit to correct a reference-voltage command value for the power converter, using a correction value for suppressing an overcurrent due to a voltage imbalance of the power system, to generate a correction-voltage command value; a voltage-command calculation unit to generate arm-voltage command values for respective phases, based on the circulating-voltage command value and the correction-voltage command value; and a gate-signal generation unit to generate control signals for the plurality of switching elements of the plurality of converter cells of the at least one arm, according to the arm-voltage command values for respective phases.

Advantageous Effects of Invention

According to the present disclosure, the operational continuity of the MMC power converter, operating as a voltage source during the system imbalance, can be improved.

DESCRIPTION OF EMBODIMENTS

Hereinafter, embodiments are described, with reference to the accompanying drawings. In the following description, like reference signs refer to like parts. Their names and functionalities are also the same. Thus, detailed description thereof will not be repeated.

[Underlying Configuration of Embodiments]

<Overall Configuration>

Figure 1:
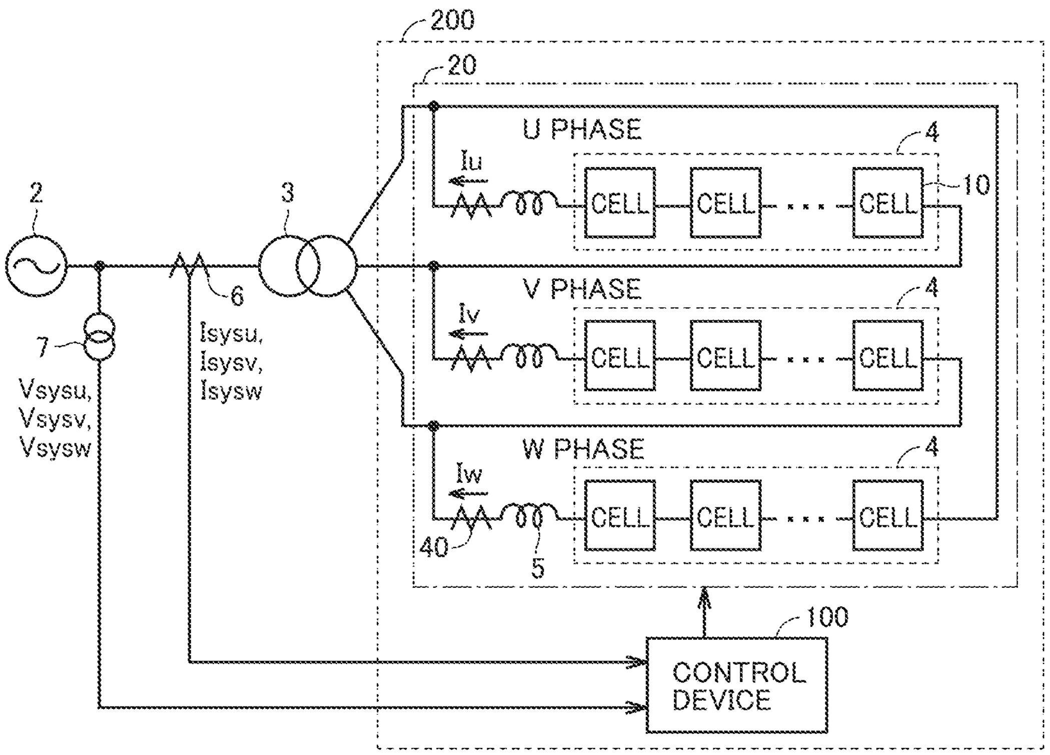
FIG. 1 is a diagram for illustrating one example of an overall configuration of a power conversion system.

FIG. 1 is a diagram for illustrating one example of an overall configuration of a power conversion system. A power conversion system 1000 includes a power system 2, an interconnection transformer 3, an alternating-current (AC) detector 6, an AC voltage detector 7, and a power conversion device 200. The power conversion device 200 includes a control device 100 and a power converter 20.

As shown in FIG. 1, the power converter 20 having delta-connected three phase arms is connected in parallel to the three-phase power system 2 via the three-phase interconnection transformer 3. Note that the power converter 20 and the power system 2 may be connected via an interconnection reactor not shown, instead of the interconnection transformer 3.

The power converter 20 has an arm 4 for each of U phase, V phase, and W phase. Each arm is configured of cascade-connected N (N: a natural number of 2 or greater) converter cells 10 and an arm reactor 5 being connected in series. In the power converter 20, the arms 4 for the respective phases are interconnected through delta-connection. As described above, connection ends of the arms 4 for the respective phases are connected to the power system 2 via a "reactor component" represented by the interconnection transformer 3.

The arm reactors 5 are inserted to suppress the circulating current circulating through the power converter 20, passing through two or more arms 4. The arm reactors 5 can be disposed at any locations or multiple number of arm reactors 5 may be inserted in a distributed manner, insofar as they are connected in series to the converter cells 10.

Figure 2:
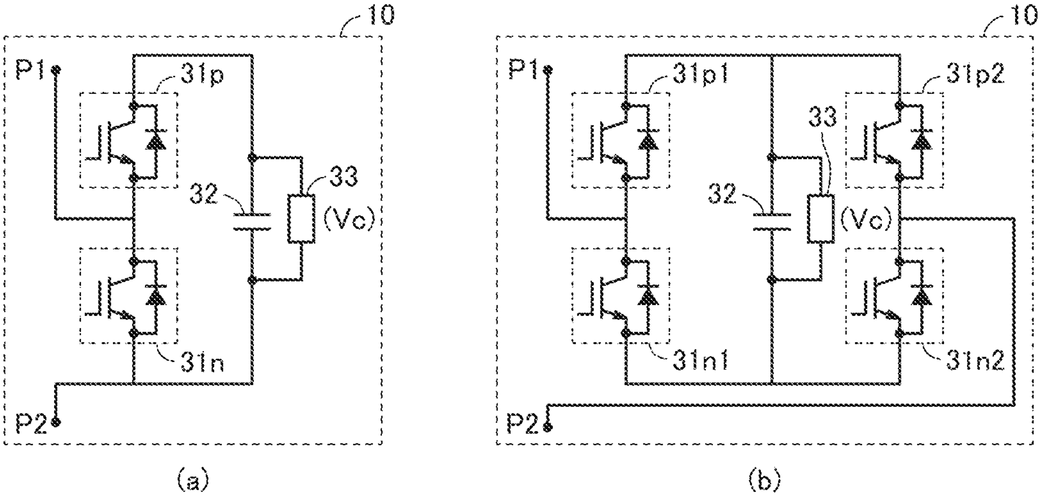
FIG. 2 is a circuit diagram showing one example of converter cells.

FIG. 2 is a circuit diagram showing one example of the converter cells 10. The converter cell 10 illustrated in (a) of FIG. 2 has a circuit structure called a half-bridge configuration. The converter cell 10 includes: a series body formed of two switching elements 31*p* and 31*n* being connected in series; a capacitor 32 as a power storage element; and a voltage detector 33. The series body and the capacitor 32 are connected in parallel. The voltage detector 33 detects Vc (hereinafter, also referred to as a capacitor voltage Vc) indicating a direct-current (DC) voltage across the capacitor 32.

The converter cell 10 illustrated in (b) of FIG. 2 has a circuit structure called a full-bridge configuration. The converter cell 10 includes: a first series body formed of two switching elements 31*p*1 and 31*n*1 being connected in series; a second series body formed of two switching elements 31*p*2 and 31*n*2 being connected in series; the capacitor 32; and the voltage detector 33. The first series body, the second series body, and the capacitor 32 are connected in parallel. The voltage detector 33 detects the capacitor voltage Vc.

The two switching elements 31*p* and 31*n* in (a) of FIG. 2 and the four switching elements 31*p*1, 31*n*1, 31*p*2, and 31*n*2 in (b) of FIG. 2 are configured of, for example, a freewheeling diode being connected in anti-parallel to a self-turn-off semiconductor switching element such as an IGBT, a GCT thyristor or a metal oxide semiconductor field-effect transistor (MOSFET). In (a) and (b) of FIG. 2, a capacitor such as a film capacitor is mainly used as the capacitor 32.

In the following description, the switching elements 31*p*, 31*n*, 31*p*1, 31*n*1, 31*p*2, and 31*n*2 are also collectively referred to as a switching element 31. On/off of the semiconductor switching element within the switching element 31 is simply referred to as "on/off of the switching element 31."

Referring to (a) of FIG. 2, the opposing terminals of the switching element 31*n* are input/output terminals P1 and P2. The voltage across the capacitor 32 and zero voltage are output by switching operations of the switching elements 31*p* and 31*n*. For example, the voltage across the capacitor 32 is output when the switching element 31*p* is on and the switching element 31*n* is off. Zero voltage is output when the switching element 31*p* is off and the switching element 31*n* is on.

Next, referring to (b) of FIG. 2, the mid-point between the switching element 31*p*1 and the switching element 31*n*1, and the mid-point between the switching element 31*p*2 and the switching element 31*n*2 are the input/output terminals P1 and P2, respectively, of the converter cell 10. The converter cell 10 shown in (b) of FIG. 2 outputs a positive voltage or zero voltage by turning the switching element 31*n*2 on, the switching element 31*p*2 off, and alternately turning the switching elements 31*p*1 and 31*n*1 on. The converter cell 10 shown in (b) of FIG. 2 can also output zero voltage or a negative voltage by turning the switching element 31*n*2 off, the switching element 31*p*2 on, and alternately turning the switching elements 31*p*1 and 31*n*1 on.

The converter cell 10, for example, has the full-bridge cell configuration illustrated in (b) of FIG. 2, and uses the semiconductor switching element, and the capacitor as the power storage element. However, the converter cell 10 may have the half-bridge configuration illustrated in (a) of FIG. 2. Moreover, any converter cell having a configuration other than those described above may be used, for example, a converter cell having a circuit structure, called a 1.5 half-bridge configuration applied thereto, in which the switching element 31*p*2 of (b) of FIG. 2 is replaced by a diode only.

Referring, again, to FIG. 1, the power converter 20 further includes arm-current detectors 40, which are disposed in one-to-one correspondence with the arms 4 for the respective phases. The arm-current detectors 40 detect arm currents Iu, Iv, and Iw passing through the arms 4 for the respective phases.

The AC current detector 6 detects AC currents Isysu, Isysv, and Isysw (hereinafter, also collectively referred to as an "AC current Isys") of the three phases of the power system 2. Note that the AC current Isys corresponds to an "output current" from the power converter 20 to the power system 2. The AC voltage detector 7 detects AC voltages Vsysu, Vsysv, and Vsysw (hereinafter, also collectively referred to as an "AC voltage Vsys") of the three phases of the power system 2. The detection values of the AC current detector 6 and the AC voltage detector 7 are input to the control device 100.

The control device 100 controls the power converter 20. The control device 100 controls on/off of each switching element 31 of each converter cell 10 to cause the power converter 20 to operate as a voltage source in accordance with an operating command value. A specific functional configuration of the control device 100 will be described below.

<Hardware Configuration of Control Device>

Figure 3:
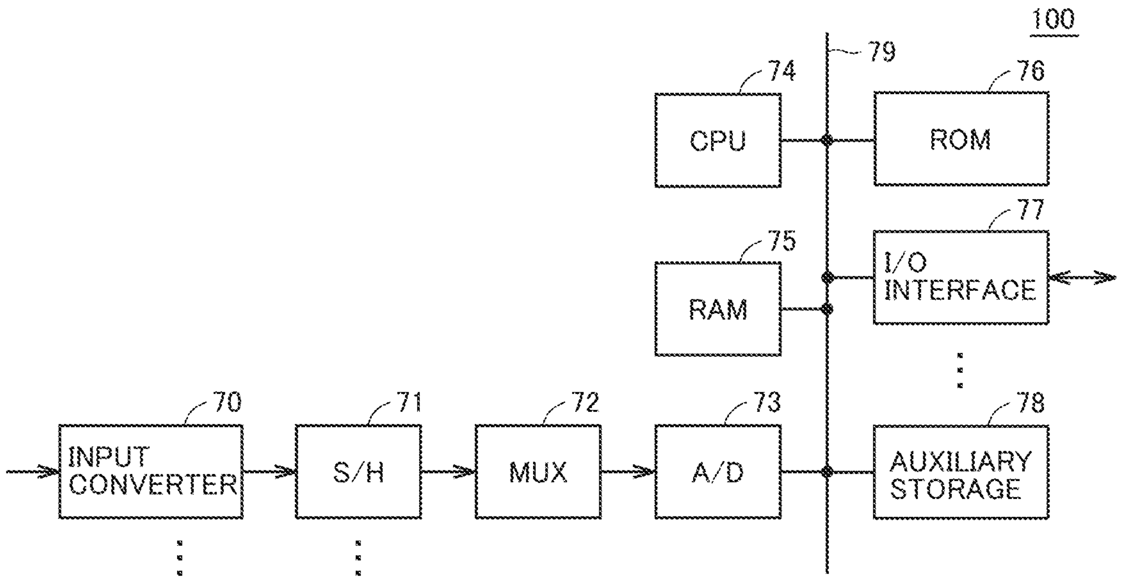
FIG. 3 is a diagram showing an example hardware configuration of a control device.

FIG. 3 is a diagram showing an example hardware configuration of the control device 100. FIG. 3 shows an example in which the control device 100 is configured of a computer.

Referring to FIG. 3, the control device 100 includes one or more input converters 70, one or more sample and hold (S/H) circuits 71, a multiplexer 72, an analog-to-digital (A/D) converter 73, one or more central processing units (CPUs) 74, a random access memory (RAM) 75, a read only memory (ROM) 76, one or more input/output interfaces 77, and an auxiliary storage 78. The control device 100 also includes a bus 79 interconnecting the components.

The input converter 70 has an auxiliary transformer for each input channel. Each auxiliary transformer converts a detection signal by each detector of FIG. 1 into a signal having a voltage level suited for the subsequent signal processing.

The S/H circuit 71 is provided for each input converter 70. The S/H circuit 71 samples and holds, at a specified sampling frequency, a signal representing an electrical quantity received from a corresponding input converter 70.

The multiplexer 72 subsequently selects the signals held by the sample and hold circuits 71. The A/D converter 73 converts the signal selected by the multiplexer 72 into a digital value. Note that multiple A/D converters 73 may be provided to perform analog-to-digital transformations on the detection signals at multiple input channels in a parallel fashion.

The CPU 74 controls the entirety of the control device 100, and performs arithmetic processing in accordance with programs. The RAM 75, as a volatile memory, and the ROM 76, as a nonvolatile memory, are used as primarily storages of the CPU 74. The ROM 76 stores programs, and settings values for the signal processing, etc. The auxiliary storage 78 is a larger-capacity nonvolatile memory, as compared to the ROM 76, and stores programs and electrical quantity detection value data, etc.

The I/O interface 77 is an interface circuit for communications between the CPU 74 and external devices.

Note that, unlike the example of FIG. 3, at least a portion of the control device 100 can be configured using a circuit such as a field programmable gate array (FPGA) and an application specific integrated circuit (ASIC), etc.

<Functional Configuration of Control Device>

Figure 4:
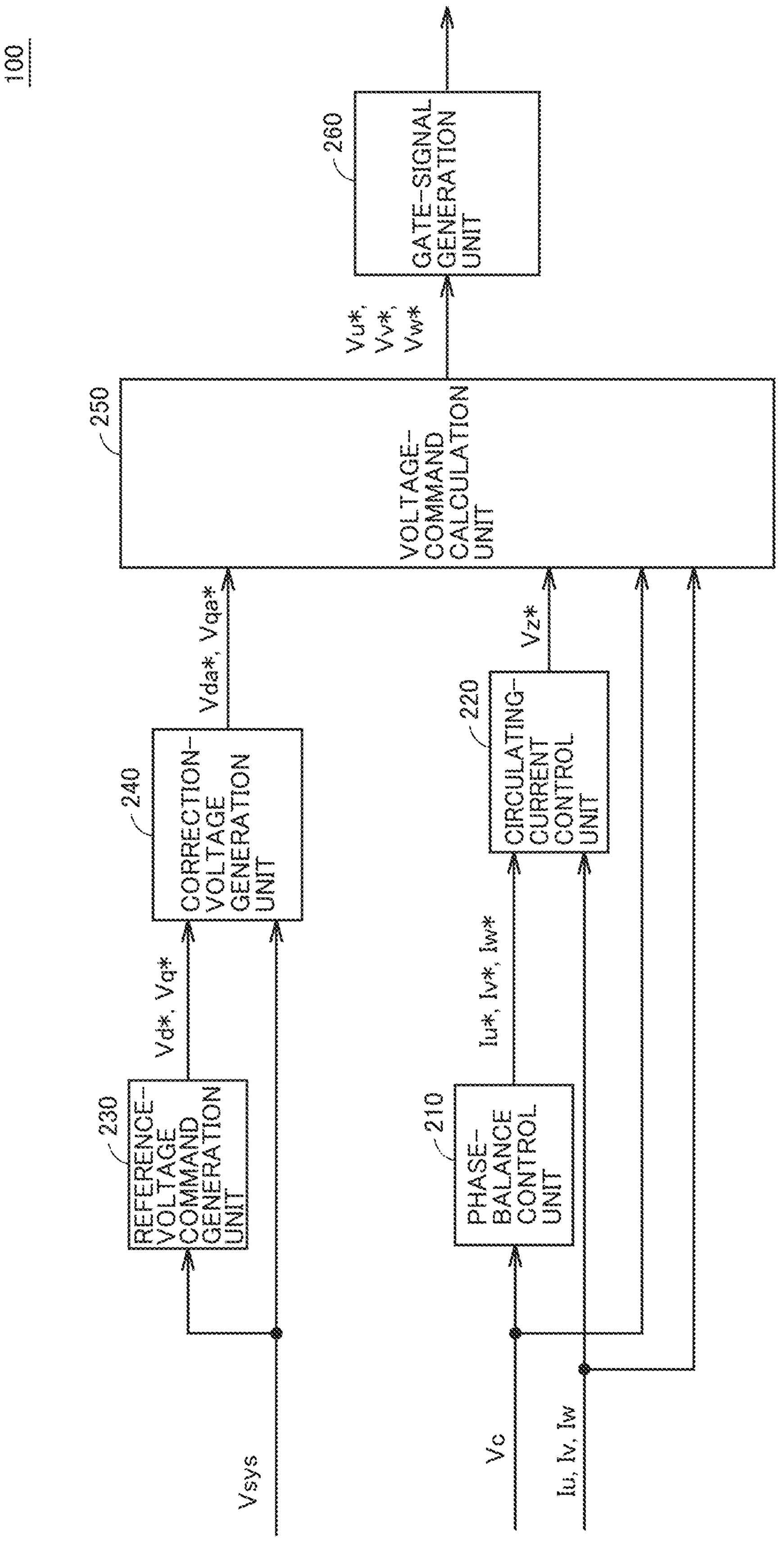
FIG. 4 is a block diagram showing one example of a functional configuration of the control device.

FIG. 4 is a block diagram showing one example of a functional configuration of the control device. Referring to FIG. 4, the control device 100 includes a phase-balance control unit 210, a circulating-current control unit 220, a reference-voltage command generation unit 230, a correction-voltage generation unit 240, a voltage-command calculation unit 250, and a gate-signal generation unit 260. The functions of these components are implemented by processing circuitry. The processing circuitry may be dedicated hardware, or CPUs executing programs stored in an internal memory of the control device 100. If the processing circuitry is dedicated hardware, the processing circuitry is configured of a FPGA, an ASIC, or a combination thereof, for example.

The phase-balance control unit 210 generates arm-current command values Iu*, Iv*, and Iw* for the respective phases, based on the DC voltages (i.e., the capacitor voltages Vc) of the capacitors 32 of the respective converter cells 10.

Specifically, the phase-balance control unit 210 calculates a balance-voltage command value Vcph for a balance voltage control for each phase, based on the capacitor voltages Vc of all the converter cells 10. For example, the balance-voltage command value Vcph can be set to an average value, a mean value, a maximum value, or a minimum value of the capacitor voltages Vc of all the converter cells 10.

The phase-balance control unit 210 calculates representative voltage values Vcu, Vcv, and Vcw of the capacitor voltages Vc of the respective capacitors 32 of N converter cells 10 of U phase, V phase, and W phase. As described above, the representative voltage values Vcu, Vcv, and Vcw can also be set to an avenge value, a mean value, a maximum value, or a minimum value of the capacitor voltages Vc of N converter cells 10 of the same phase. Note that the representative voltage values Vcu, Vcv, and Vcw of the respective phases oscillate at $2f$ (provided that f is a fundamental frequency). Thus, the AC component is removed from $2f$ by the filter and $2f$ includes the DC component only.

The phase-balance control unit 210 computes deviations ΔVcu, ΔVcv, and ΔVcw between the balance-voltage command value Vcph and the representative voltage values Vcu, Vcv, and Vcw of the respective phases. ΔVcu=Vcph−Vcu, ΔVcv=Vcph−Vcv, and ΔVcw=Vcph−Vcw hold true.

The phase-balance control unit 210 computes the arm-current command values Iu*, Iv*, and Iw* of the respective phases that cause the representative voltage values Vcu, Vcv, and Vcw of the respective phases to follow the balance-voltage command value Vcph. In other words, the phase-balance control unit 210 performs a feedback operation for reducing the deviations ΔVcu, ΔVcv, and ΔVcw to be less than a specified value (e.g., setting the deviations to zero) to generate the arm-current command values Iu*, Iv*, and Iw* for the respective phases. The phase-balance control unit 210 can be configured of, for example, a proportional controller, a PI controller, a PID controller, or other controller that is used for the feedback control, etc. The control by the phase-balance control unit 210 corresponds to an inter-phase balance voltage control for causing the representative values of the respective phase voltages to match the command values.

The circulating-current control unit 220 receives an input of the arm-current command values Iu*, Iv*, and Iw* of the respective phases, and the arm currents Iu, Iv, and Iw of the respective phases detected by the arm-current detectors 40. The circulating-current control unit 220 generates a circulating-current command value Iz* for controlling a circulating current Iz, based on the arm-current command values Iu*, Iv*, and Iw* of the respective phases.

Specifically, using the arm-current command values Iu*, Iv*, and Iw* of the respective phases, the circulating-current control unit 220 calculates the circulating-current command value Iz* according to Equation (1):

$$Iz* = (Iu* + Iv* + Iw*)/3 \quad (1)$$

Using the detected arm currents Iu, Iv, and Iw of the respective phases, the circulating-current control unit 220 further calculates the circulating current Iz according to Equation (2):

$$Iz = (Iu + Iv + Iw)/3 \quad (2)$$

The circulating-current control unit 220 computes a deviation ΔIz (=Iz*–Iz) between the circulating-current command value Iz* and the circulating current Iz. The circulating-current control unit 220 generates a circulating-voltage command value Vz* that causes the circulating current Iz to follow the circulating-current command value Iz*. In other words, the circulating-current control unit 220 performs a feedback operation for reducing the deviation ΔIz to be less than a specified value (e.g., reducing the deviation ΔIz to zero) to generate the circulating-voltage command value Vz*. The circulating-current control unit 220 can be configured of, for example, a proportional controller, a PI controller, a PID controller, or other controller that is used for the feedback control, etc.

The reference-voltage command generation unit 230 generates a reference-voltage command value Vd* for the d axis and a reference-voltage command value Vq* for the q axis in a two-axis (i.e., dq) rotating frame, as reference-voltage command values for causing the power converter 20 to operate as a voltage source.

For example, the reference-voltage command generation unit 230 can use any well-known technique to create the reference-voltage command values Vd* and Vq* (hereinafter, also collectively referred to as a "reference-voltage command value V*") for simulating the behavior of a synchronous generator when connected to the power system. For example, in PTL 1, the reference-voltage command values Vd* and Vq* may be voltage command values of d-q axis, which are obtained by performing a three-phase-to-two-phase transformation on the voltage command values that are generated when the operation of the output current suppression unit is caused to stop and the internal impedance is fixed.

Note that the reference-voltage command value V* may not be the voltage command value for causing an operation as a virtual synchronous machine. For example, the reference-voltage command generation unit 230 performs, using a reference phase θ, the three-phase-to-two-phase transformation on the AC voltages Vsysu, Vsysv, and Vsysw to calculate a d-axis voltage Vd and a q-axis voltage Vq. The reference phase θ is a reference that is used for controlling the power converter 20. The reference-voltage command generation unit 230 performs a feedback control for reducing the deviations between the d-axis voltage Vd and a d-axis voltage command value Vdt (e.g., the reactive component of a target voltage) to zero to generate the reference-voltage command value Vd*. The reference-voltage command generation unit 230 performs a feedback control for reducing the deviation between the q-axis voltage Vq and a q-axis voltage command value Vqt (e.g., the active component of the target voltage) to zero to generate the reference-voltage command value Vq*. The d-axis voltage command value Vdt and the q-axis voltage command value Vqt are, for example, pre-set by a system operator or the like.

The correction-voltage generation unit 240 uses a correction value for suppressing the overcurrent caused by a voltage imbalance of the power system 2 to correct the reference-voltage command values Vd* and Vq* of the power converter 20 to generate correction-voltage command values Vda* and Vqa* (hereinafter, also collectively referred to as a "correction-voltage command value Va*"). A specific configuration of the correction-voltage generation unit 240 will be described below.

The voltage-command calculation unit 250 generates arm-voltage command values Vu*, Vv*, and Vw* of the respective phases, based on the circulating-voltage command value Vz* and the correction-voltage command value Va*. Specifically, the voltage-command calculation unit 250 uses the reference phase θ to perform the two-phase-to-three-phase transformation on the correction-voltage command values Vda* and Vqa* on the d-q axis to compute voltage command values Vuo*, Vvo*, and Vwo* for the three phases. Next, the voltage-command calculation unit 250 adds the circulating-voltage command value Vz* to each of the voltage command values Vuo*, Vvo*, and Vwo* of the three phases to generate the arm-voltage command values Vu*, Vv*, and Vw* of the respective phases. Vu*=Vuo*+Vz*, Vv*=Vvo*+Vz*, and Vwo*=Vw*+Vz* hold true.

Based on the arm-voltage command values Vu*, Vv*, and Vw* of the respective phases, the gate-signal generation unit 260 computes output-voltage command values Vucell*, Vvcell*, and Vwcell* for the converter cells 10 of the respective phases. The gate-signal generation unit 260 performs a pulse width modulation (PWM) control based on the output-voltage command values Vucell*, Vvcell*, and Vwcell* to generate gate signals for controlling the on-off drive of the switching elements 31 of the respective converter cell 10 of the respective phases.

For example, a method of generation of the output-voltage command value Vucell* for the converter cells of U phase is now described. The gate-signal generation unit 260 compares the output-voltage command value Vucell* with a voltage of a carrier signal CS from a carrier generator (not shown) to generate a PWM modulated signal. The carrier signal CS is configured of a periodic signal having a triangular wave, for example.

If the voltage of the output-voltage command value Vucell* is higher than the voltage of the carrier signal CS, the PWM modulated signal is set to high. Conversely, if the voltage of the carrier signal CS is higher than the output-voltage command value Vucell*, the PWM modulated signal is set to low. The carrier signal CS is generated so that the timing of the PWM signal is shifted between N converter cells 10 of the respective phases, so that a phase-shifted PWM control is implemented.

The gate-signal generation unit 260 generates, in a similar manner to the above, the output-voltage command value Vvcell* for the converter cells 10 of V phase, and the output-voltage command value Vwcell* for the converter cells 10 of W phase. This allows the gate-signal generation unit 260 to generate, based on the PWM modulated signals, a gate signal for controlling on/off of the switching elements 31 included in the converter cell 10. Each switching element 31 of each converter cell 10 is on-off driven in accordance with the gate signal.

Embodiment 1

<Configuration of Correction-Voltage Generation Unit>

Figure 5:
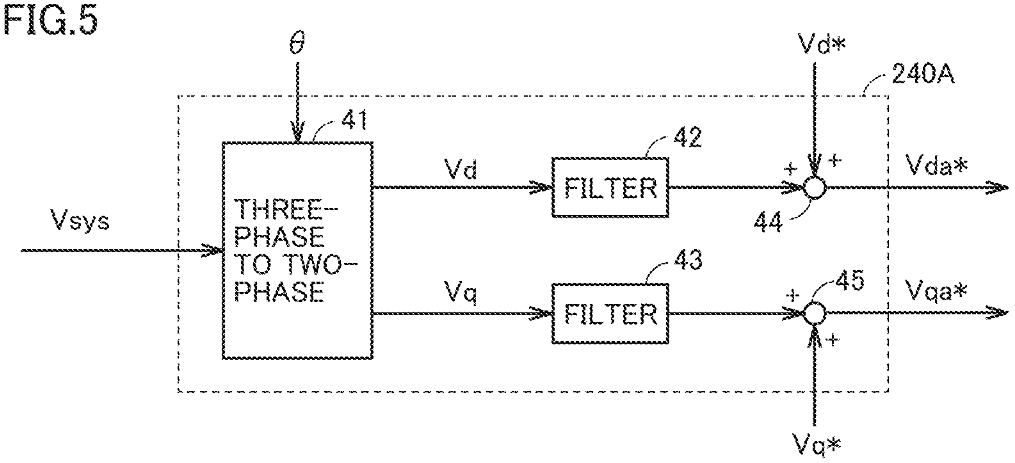
FIG. 5 is a block diagram showing an example functional configuration of a correction-voltage generation unit according to Embodiment 1.

FIG. 5 is a block diagram showing an example functional configuration of a correction-voltage generation unit 240A according to Embodiment 1. Referring to FIG. 5, for convenience, the symbol "A" is added to the correction-voltage generation unit 240A while the correction-voltage generation unit 240A corresponds to the correction-voltage generation unit 240 of FIG. 4. The same goes for Embodiments 2 and 3 below.

The correction-voltage generation unit 240A computes a correction value by subjecting the AC voltage Vsys of the power system 2 to a filtering process for removing the DC component from the AC voltage, and generates the correction-voltage command value Va* by adding the correction value to the reference-voltage command value V*. Specifically, the correction-voltage generation unit 240A includes a coordinate transformation unit 41, filters 42 and 43, and adders 44 and 45.

The coordinate transformation unit 41 performs three-phase-to-two-phase transformation on the AC voltages Vsysu, Vsysv, and Vsysw, using the reference phase θ to compute the d-axis voltage Vd and the q-axis voltage Vq.

The filter 42 subjects the d-axis voltage Vd to a high-pass filtering process to compute a d-axis voltage Vdh having the DC component of the d-axis voltage Vd removed therefrom. The filter 43 subjects the q-axis voltage Vq to the high-pass filtering process to compute a q-axis voltage Vqh having the DC component of the q-axis voltage Vq removed therefrom. Note that the filters 42 and 43 may remove the DC component from the d-axis voltage Vd and the q-axis voltage Vq, respectively, and may be any filter other than the high-pass filters.

The adder 44 adds the d-axis voltage Vdh to the d-axis component of the reference-voltage command value (i.e., the reference-voltage command value Vd*) to generate the d-axis component of the correction-voltage command value (i.e., the correction-voltage command value Vda*). The adder 45 adds the q-axis voltage Vqh to the q-axis component of the reference-voltage command value (i.e., the reference-voltage command value Vq*) to generate the q-axis component of the correction-voltage command value (i.e., the correction-voltage command value Vqa*). This suggests that the d-axis voltage Vdh corresponds to the d-axis component of the correction value for correcting the reference-voltage command value Vd*. Similarly, the q-axis voltage Vqh corresponds to the q-axis component of the correction value for correcting the reference-voltage command value Vq*.

Advantageous Effects of Embodiment 1

For ease of understanding of the advantageous effects of Embodiment 1, a case is described in which the d-axis voltage Vdh and the q-axis voltage Vqh are not added to the reference-voltage command value. In this case, the power converter 20 operates in accordance with arm-voltage command values reflecting the reference-voltage command values Vd* and Vq*.

Here, in the normal state where no accident or the like occurs at the power system 2 (i.e., no system voltage imbalance occurs), a component (i.e., the AC voltage Vsys), other than the positive sequence component of the system voltage, is not generated (or a very little). Thus, the power converter 20 operates as a voltage source independent of the system voltage, in accordance with the reference-voltage command values (e.g., the reference-voltage command values Vd* and Vq* generated by the reference-voltage command generation unit 230) generated by a specified method of generation.

In the event of an accident or the like in the power system 2 (i.e., in the event of a system voltage imbalance), in contrast, a component (e.g., the negative sequence component), other than the positive sequence component of the system voltage is generated. Thus, as the power converter 20 operates as a voltage source in accordance with the reference-voltage command values, a difference is generated in negative sequence component between the system voltage and the output voltage of the power converter 20. This causes a large negative-sequence current to flow from the power system 2 into the power converter 20. Consequently, an imbalance of the capacitor voltages of each phase is caused or an overcurrent occurs in the power converter 20.

In order to suppress the overcurrent as described above, in Embodiment 1, the d-axis voltage Vdh and the q-axis voltage Vqh, having the DC component removed therefrom, are fed forward and added to the reference-voltage command values Vd* and Vq*, and the correction-voltage command values Vda* and Vqa* are generated. This allows the power converter 20 to operate in accordance with the arm-voltage command values reflecting the correction-voltage command values Vda* and Vqa*.

If no voltage imbalance is created in the power system 2, the system voltage includes the positive sequence component only. Here, the positive sequence component of the system voltage corresponds to the DC component on the d-q axis coordinates. Thus, the d-axis voltage Vd and the q-axis voltage Vq include the DC component only.

Since the filters 42 and 43 perform the filtering process in which the DC component is removed from the d-axis voltage Vd and the q-axis voltage Vq that include the DC component only, the computed d-axis voltage Vdh and q-axis voltage Vqh are zero. Thus, the correction-voltage command value Vda* matches the reference-voltage command value Vd*, and the correction-voltage command value Vqa* matches the reference-voltage command value Vq*. This allows the power converter 20 to operate as a voltage source, independent of the system voltage, in accordance with the reference-voltage command values (i.e., the reference-voltage command values Vd* and Vq*) generated by the specified method of generation.

In contrast, if a voltage imbalance is created in the power system 2, the system voltage includes the positive sequence component and other component. The d-axis voltage Vd and the q-axis voltage Vq include the DC component and the other component.

Since the filters 42 and 43 perform the filtering process in which the DC component is removed from the d-axis voltage Vd and the q-axis voltage Vq, the computed d-axis voltage Vdh and q-axis voltage Vqh include the other component, not including the DC component. In this case, the correction-voltage command value Vda* is the sum of the reference-voltage command value Vd* and the d-axis voltage Vdh which includes the other component. The correction-voltage command value Vqa* is the sum of the reference-voltage command value Vq* and the q-axis voltage Vqh which includes the other component. This generates the correction-voltage command values whose positive sequence component reflects the reference-voltage command values, and whose other component, other than the positive sequence component, reflects other component of the system voltage.

The power converter 20 operates as a voltage source in accordance with such correction-voltage command values, thereby operating as a voltage source for the positive sequence component, and outputting other component similar to the system voltage for other component (e.g., the negative sequence component). Thus, the current (e.g., the negative-sequence current), having the other component, flowing from the power system 2, can be suppressed even during the system imbalance, consequently, suppressing the overcurrent at the power converter 20.

From the foregoing, according to Embodiment 1, the power converter 20 can operate as a voltage source and suppress the current having the other component, not including the positive sequence component, flowing from the power system 2. Thus, the overcurrent in the power converter 20 can be prevented even during the system imbalance, improving the operational continuity of the power converter 20.

Embodiment 2

<Configuration of Correction-Voltage Generation Unit>

Figure 6:
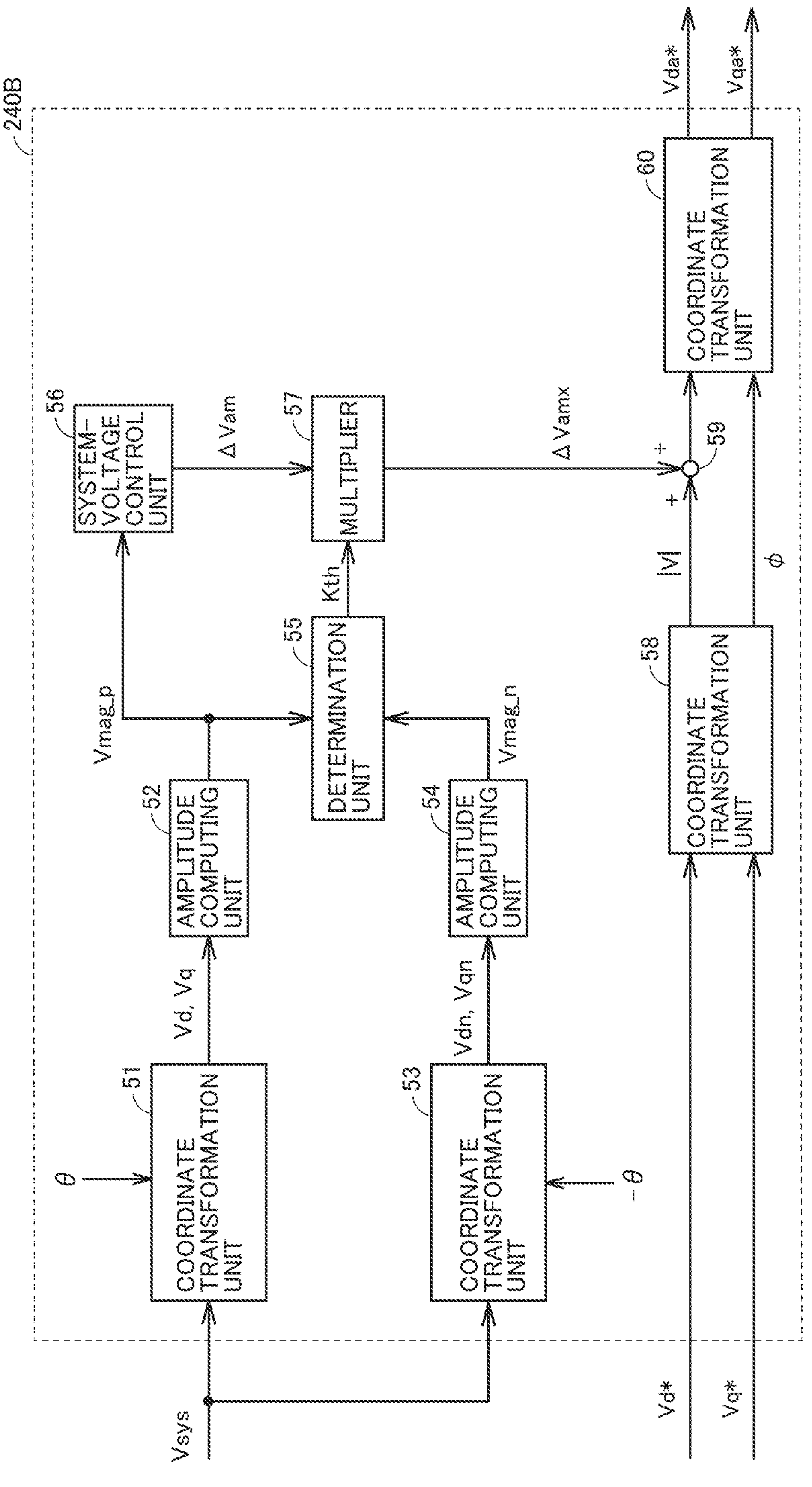
FIG. 6 is a block diagram showing an example functional configuration of a correction-voltage generation unit according to Embodiment 2.

FIG. 6 is a block diagram showing an example functional configuration of a correction-voltage generation unit 240B according to Embodiment 2. Referring to FIG. 6, the correction-voltage generation unit 240B computes an amplitude correction value for correcting the amplitude of a reference-voltage command value V*, based on an AC voltage Vsys of a power system 2. If no voltage imbalance is created in the power system 2, the correction-voltage generation unit 240B adds the amplitude correction value to the amplitude of the reference-voltage command value V* to generate a correction-voltage command value Va*. If a voltage imbalance is created in the power system 2, the correction-voltage generation unit 240B adds a value less than the amplitude correction value to the amplitude of the reference-voltage command value V* to generate the correction-voltage command value Va*.

Specifically, the correction-voltage generation unit 240B includes coordinate transformation units 51, 53, 58, and 60, amplitude computing units 52 and 54, a determination unit 55, a system-voltage control unit 56, a multiplier 57, and an adder 59.

The coordinate transformation unit 51 performs three-phase-to-two-phase transformation on AC voltages Vsysu, Vsysv, and Vsysw, using a reference phase θ, and calculates d-axis voltage Vd and q-axis voltage Vq of the positive phase. Using the negative phase "−θ" of the reference phase θ, the coordinate transformation unit 53 performs three-phase-to-two-phase transformation on the AC voltages Vsysu, Vsysv, and Vsysw, and calculates d-axis voltage Vdn and q-axis voltage Vqn of the negative phase.

The amplitude computing unit 52 computes a positive-sequence voltage swing Vmag_p, which is an amplitude for the d-axis voltage Vd and the q-axis voltage Vq. Specifically, the amplitude computing unit 52 removes a high-frequency component from the d-axis voltage Vd and the q-axis voltage Vq by a moving average filter or the like, and computes a root-sum-square (i.e., $(Vd^2+Vq^2)^{1/2}$) of the resultant d-axis voltage Vd and q-axis voltage Vq. The amplitude computing unit 52 outputs the root-sum-square as the positive-sequence voltage swing Vmag_p.

The amplitude computing unit 54 computes a negative-sequence voltage swing Vmag_n, which is an amplitude for the d-axis voltage Vdn and the q-axis voltage Vqn.

Specifically, the amplitude computing unit 54 removes a high-frequency component from the d-axis voltage Vdn and the q-axis voltage Vqn by a moving average filter or the like, and computes a root-sum-square (i.e., $(Vdn^2+Vqn^2)^{1/2}$) of the resultant d-axis voltage Vdn and q-axis voltage Vqn. The amplitude computing unit 54 outputs the root-sum-square as the negative-sequence voltage swing Vmag_n.

The determination unit 55 determines whether a voltage imbalance is created in the power system 2, based on the positive-sequence voltage swing Vmag_p and the negative-sequence voltage swing Vmag_n. Specifically, the determination unit 55 determines whether a condition is met in which the positive-sequence voltage swing Vmag_p is less than a threshold Vthp and the negative-sequence voltage swing Vmag_n is greater than or equal to a threshold Vthn.

If the condition is met, the determination unit 55 determines that a voltage imbalance is created in the power system 2, and outputs a constant Kth. The constant Kth is greater than or equal to zero and less than 1, and is, typically, zero. If the condition is not met, in contrast, the determination unit 55 determines that no voltage imbalance is created and outputs a value of "1."

As another example, the determination unit 55 may output the constant Kth that is based on a difference ΔVmag (=Vmag_p−Vmag_n) between the positive-sequence voltage swing Vmag_p and the negative-sequence voltage swing Vmag_n. In this case, however, the constant Kth is greater than or equal to zero and less than or equal to 1. The greater the difference ΔVmag is, a greater constant Kth the determination unit 55 outputs. Typically, the constant Kth is "1" when no voltage imbalance is created, and the constant Kth is "zero" when a great voltage imbalance is created.

In order to cause the AC voltage Vsys to follow a target voltage, the system-voltage control unit 56 generates a voltage-swing correction amount ΔVam for correcting the amplitude of the reference-voltage command value V*.

Figure 7:
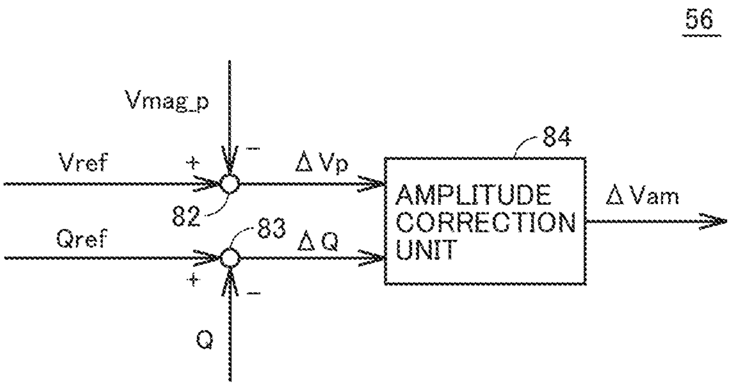
FIG. 7 is a block diagram showing an example functional configuration of a system-voltage control unit according to Embodiment 2.

FIG. 7 is a block diagram showing an example functional configuration of the system-voltage control unit according to Embodiment 2. The system-voltage control unit 56 includes subtractors 82 and 83 and an amplitude correction unit 84.

The subtractor 82 computes a deviation ΔVp between a system-voltage command value Vref and the positive-sequence voltage swing Vmag_p. The subtractor 83 computes a deviation ΔQ between a reactive-power command value Qref and a reactive power Q of the power system 2.

The amplitude correction unit 84 selects one of an automated voltage adjusting mode and an automated reactive-power adjusting mode, and generates the voltage-amplitude correction amount ΔVam based on the selected mode. Specifically, if the amplitude correction unit 84 selects the automated voltage adjusting mode, the amplitude correction unit 84 generates the amplitude correction amount ΔVam by a feedback control for reducing the deviation ΔVp. If the amplitude correction unit 84 selects the automated reactive-power adjusting mode, the amplitude correction unit 84 generates the amplitude correction amount ΔVam by a feedback control for reducing the deviation ΔQ to zero. The amplitude correction unit 84 is configured of a PI controller, a primary lag element, etc.

Referring, again, to FIG. 6, the multiplier 57 outputs a multiplied value ΔVamx obtained by multiplying the amplitude correction amount ΔVam output from the system-voltage control unit 56 by a value output from the determination unit 55 (i.e., the constant Kth or 1). For example, suppose that the output value from the determination unit 55 is "1" if no voltage imbalance is created, and the output value from the determination unit 55 is "0" if a voltage imbalance is created, the multiplied value ΔVamx is ΔVam if no voltage imbalance is created, and the multiplied value ΔVamx is zero if a voltage imbalance is created.

The coordinate transformation unit 58 transforms the reference-voltage command value Vd* and the reference-voltage command value Vq* into an amplitude |V| and a phase φ. The phase φ matches the reference phase θ. The adder 59 outputs the sum of the amplitude |V| and the multiplied value ΔVamx. The coordinate transformation unit 60 performs d-q axis transformation on the sum and the phase φ to generate correction-voltage command values Vda* and Vqa*.

Advantageous Effects of Embodiment 2

According to Embodiment 2, typically, if no voltage imbalance is created in the power system 2, the multiplied value ΔVamx added to the amplitude |V| of the reference-voltage command value is the same value as the amplitude correction amount ΔVam, resulting in generation of the correction-voltage command value Va* reflecting the amplitude correction amount ΔVam. In this case, the power converter 20 outputs a reactive power as a function of the amplitude correction amount ΔVam to perform the automated control of the system voltage.

When the voltage imbalance is created in the power system 2, in contrast, the multiplied value ΔVamx added to the amplitude |V| of the reference-voltage command value is zero. Thus, the correction-voltage command value Va* does not reflect the amplitude correction amount ΔVam. In this case, the power converter 20 does not output the reactive power as a function of the amplitude correction amount ΔVam, and does not perform the automated control of the system voltage. This is to suppress the imbalance of the capacitor voltages of each phase and suppress the overcurrent in the power converter 20 during the voltage imbalance.

Here, consider a case in which, during the voltage imbalance, the power converter 20 outputs a reactive power as a function of the amplitude correction amount ΔVam to perform the automated control of the system voltage. In this case, the power converter 20 outputs the reactive power, thereby creating an imbalance of the capacitor voltages of each phase. Thus, a circulating-current command value Iz* based on arm-current command values Iu*, Iv*, and Iw* from a phase-balance control unit 210 does not become zero, causing the circulating current Iz as a function of the circulating-current command value Iz* to flow through the power converter 20 in order to resolve the imbalance. In other words, a greater voltage imbalance causes a greater reactive power to be output, and the circulating current Iz increases accordingly. As a result, the overcurrent occurs, causing the protection shutdown of the power converter 20.

Given these circumstances, in Embodiment 2, if no voltage imbalance is created, the automated control function of the system voltage is enabled, and, in the event of a voltage imbalance, the automated control function of the system voltage is disabled and the overcurrent is suppressed. Thus, the operational continuity of the power converter 20 can be improved even during the voltage imbalance.

Embodiment 3

<Configuration of Correction-Voltage Generation Unit>

Figure 8:
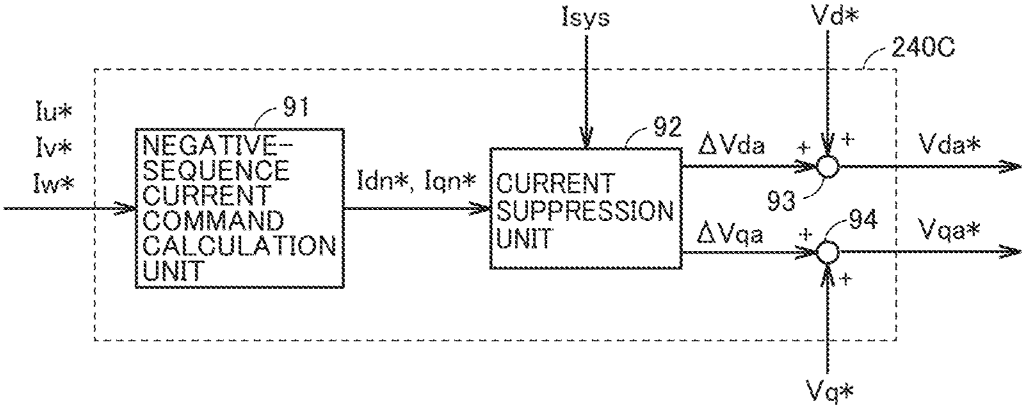
FIG. 8 is a block diagram showing an example functional configuration of a correction-voltage generation unit according to Embodiment 3.

FIG. 8 is a block diagram showing an example functional configuration of a correction-voltage generation unit 240C according to Embodiment 3. Referring to FIG. 8, the correction-voltage generation unit 240C computes negative-sequence-current command values Idn* and Iqn*, based on arm-current command values Iu*, Iv*, and Iw* for the respective phases. Subsequently, based on the detection value of an output current (i.e., an AC current Isys) from a power converter 20, and the negative-sequence-current command values Idn* and Iqn*, the correction-voltage generation unit 240C computes voltage correction values ΔVda and ΔVqa for suppressing the output current to a current limit value or less. The correction-voltage generation unit 240C further adds voltage correction values ΔVda and ΔVqa to reference-voltage command values Vd* and Vq*, respectively, to generate correction-voltage command values Vda* and Vqa*.

Specifically, the correction-voltage generation unit 240C includes a negative-sequence current command calculation unit 91, a current suppression unit 92 and adders 93 and 94.

The negative-sequence current command calculation unit 91 adds up the arm-current command values Iu*, Iv*, and Iw* of the respective phases and divides the sum by 3 to compute the circulating-current command value Iz*, as indicated by Equation (1). The negative-sequence current command calculation unit 91 computes deviations ΔIuz, ΔIvz, and ΔIwz between the circulating-current command value Iz* and the arm-current command values Iu*, Iv*, and Iw* of the respective phases and extracts the positive sequence component and the negative sequence component. ΔIuz=Iu*−Iz*, ΔIvz=Iv*−Iz*, and ΔIwz=Iw*−Iz* hold true.

Subsequently, the negative-sequence current command calculation unit 91 compute a value R1 obtained performing a three-phase-to-two-phase coordinate transformation on the extracted positive and negative sequence components. The negative-sequence current command calculation unit 91 performs a filtering process for extracting the positive sequence component from the value R1 to compute a value R2. The negative-sequence current command calculation unit 91 subtracts the value R2 from the value R1 to compute the negative-sequence-current command values Idn* and Iqn*. Note that the filter used for the extraction of the positive sequence component has a function to remove the negative sequence component from a filter input value to extract the positive sequence component. In the positive-phase coordinate system, the positive sequence component is a DC component, and the negative sequence component is a double-frequency component (2f) of the fundamental frequency. Thus, a first-order lag filter, a 2f moving average filter, a 2f notch filter, etc. is used.

Based on the detection value (i.e., the AC current Isys) of an output current of the power converter 20, and the negative-sequence-current command values Idn* and Iqn*, the current suppression unit 92 calculates the voltage correction values ΔVda and ΔVqa for suppressing the output current to the current limit value or less.

Figure 9:
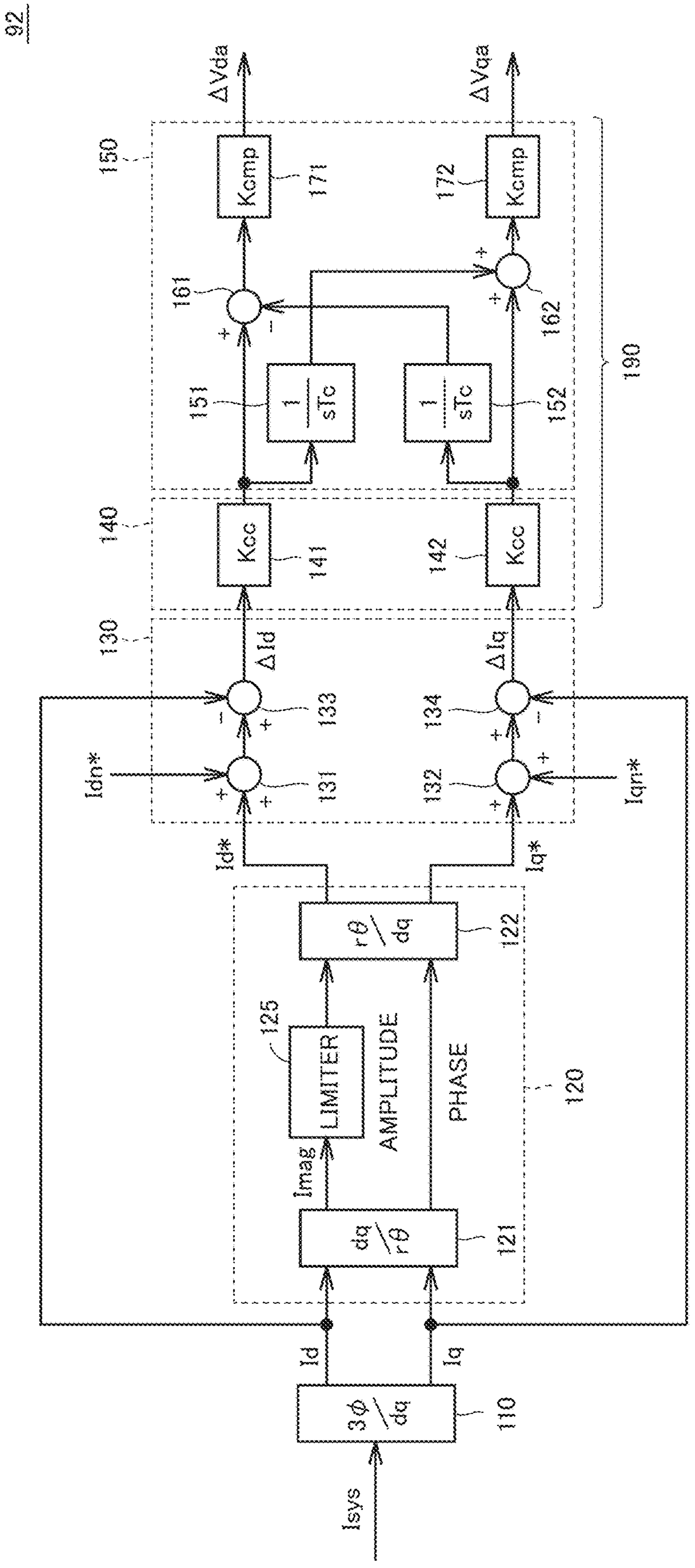
FIG. 9 is a block diagram showing an example functional configuration of a current suppression unit according to Embodiment 3.

FIG. 9 is a block diagram showing an example functional configuration of a current suppression unit according to Embodiment 3. Referring to FIG. 9, a current suppression unit 92 includes a coordinate transformation unit 110, a current command value generation unit 120, a deviation computing unit 130, and a control computing unit 190.

The coordinate transformation unit 110 performs three-phase-to-two-phase transformation on the detection value of the AC current Isys and computes a d-axis current Id and a q-axis current Iq.

The current command value generation unit 120 generates a d-axis current command value Id* and a q-axis current command value Iq*, based on the d-axis current Id, the q-axis current Iq, and a current limit value Imax. Specifically, the current command value generation unit 120 includes coordinate transformation units 121 and 122 and a limiter 125. The coordinate transformation unit 121 performs polar-coordinate (rθ) transformation on the d-axis current Id and the q-axis current Iq on the d-q axis and outputs a current amplitude Imag and a current phase θi.

Using the d-axis current Id and the q-axis current Iq, the current amplitude Imag and the current phase $\theta i$ can be represented by Equations (3) and (4):

$$Imag = \left(Id^2 + Iq^2\right)^{1/2} \tag{3}$$

$$\theta i = \tan^{-1}\left(Iq/Id\right) \tag{4}$$

If the current amplitude Imag is greater than or equal to the current limit value Imax, the limiter 125 outputs the current limit value Imax. If the current amplitude Imag is less than the current limit value Imax (i.e., Imag<Imax), the limiter 125 outputs the current amplitude Imag from the coordinate transformation unit 121.

Here, the following description assumes that the current amplitude of the AC current Isys and the current amplitude Imag determined by Equation (3) are the same. Thus, the upper limit for the limiter 125 is set to the same value as the current limit value of the AC current Isys. However, if the coordinate transformation unit 110 performs the three-phase-to-two-phase transformation so that the current amplitude of the AC current Isys is K times (K: a constant) the current amplitude Imag on the d-q axis determined by Equation (3), the upper limit for the limiter 125 is set to (1/K) times the current limit value Imax.

The coordinate transformation unit 122 uses the output value from the limiter 125 as the amplitude, and transforms the current phase θi output from the coordinate transformation unit 121 from polar coordinates to d-q coordinates to generate a the d-axis current command value Id* and a the q-axis current command value Iq*.

A ratio of Iq* to Id* (i.e., Iq*/Id*) corresponding to the phases of the d-axis current command value Id* and the q-axis current command value Iq* is the same as a ratio of the q-axis current Iq to the d-axis current Id (i.e., Iq/Id) which is generated from the detection value of the AC current Isys. The amplitude of the d-axis current command value Id* and the q-axis current command value Iq* (i.e., $(Id^{*2}+Iq^{*2})^{1/2}$), in contrast, are set less than or equal to the current limit value Imax by the limiter 125.

Accordingly, if the current amplitude Imag of the output current (i.e., the AC current Isys) from the power converter 20 is less than or equal to the current limit value Imax, the current command value generation unit 120 generates the d-axis current Id and the q-axis current Iq as the d-axis current command value Id* and the q-axis current command value Iq*, respectively.

If the current amplitude Imag is greater than the current limit value Imax, in contrast, the current command value generation unit 120 generates a d-axis current value and a q-axis current value, which are corresponding to the current limit value Imax, as a the d-axis current command value and a the q-axis current command value, respectively. Specifically, the d-axis current command value Id* and the q-axis current command value Iq* are set so that the amplitude (i.e., $(Id^{*2}+Iq^{*2})^{1/2}$) is the current limit value Imax and a ratio between Id* and Iq* is the same as a ratio between Id and Iq.

The deviation computing unit 130 computes a current deviation ΔId between the d-axis current and the sum of the d-axis current command value Id* and the d-axis component of the negative-sequence-current command value (i.e., the negative-sequence-current command value Idn*). The deviation computing unit 130 also computes a current deviation ΔIq between the q-axis current and the sum of the q-axis current command value Iq* and the q-axis component of the negative-sequence-current command value (i.e., the negative-sequence-current command value Iqn*).

Specifically, the deviation computing unit 130 has adders 131 and 132 and subtractors 133 and 134. The adder 131 adds up the d-axis current command value Id* and the negative-sequence-current command value Idn*. The subtractor 133 subtracts the d-axis current Id from the sum (Id*+Idn*) by the adder 131 to calculate the current deviation ΔId. The adder 132 adds up the q-axis current command value Iq* and the negative-sequence-current command value Iqn*. The subtractor 134 subtracts the q-axis current Iq from the sum (Iq*+Iqn*) by the adder 132 to calculate the current deviation ΔIq.

The control computing unit 190 calculates the voltage correction value ΔVda for compensating for the current deviation ΔId, and the voltage correction value ΔVqa for compensating for the current deviation ΔIq. Note that ΔVda is the d-axis component of the voltage correction value, and ΔVqa is the q-axis component of the voltage correction value. Specifically, the control computing unit 190 includes a proportional control unit 140 and a correction-value calculation unit 150.

The proportional control unit 140 has proportioners 141 and 142. The proportioner 141 outputs a multiplied value MP1 (=Kcc×ΔId) obtained by multiplying the current deviation ΔId output from the subtractor 133 by a proportional gain Kcc. The proportioner 142 outputs a multiplied value MP2 (=Kcc×ΔIq) obtained by multiplying the current deviation ΔIq output from the subtractor 134 by the proportional gain Kcc.

The correction-value calculation unit 150 calculates the voltage correction value ΔVda and the voltage correction value ΔVqa. Specifically, the correction-value calculation unit 150 calculates the voltage correction value ΔVda based on the multiplied value MP1 and the integration value of the multiplied value MP2, and calculates the voltage correction value ΔVqa based on the multiplied value MP2 and the integration value of the multiplied value MP1. Specifically, the correction-value calculation unit 150 includes integrators 151 and 152 with a time constant Tc, a subtractor 161, an adder 162, and multipliers 171 and 172.

The integrator 151 outputs to the adder 162 the integration value of the multiplied value MP1 output from the proportioner 141. The integrator 152 outputs to the subtractor 161 the integration value of the multiplied value MP2 output from the proportioner 142.

The subtractor 161 outputs a difference obtained by subtracting the integration value of the multiplied value MP2 from the multiplied value MP1. The adder 162 outputs the sum of the multiplied value MP2 and the integration value of the multiplied value MP1.

The multiplier 171 outputs a value obtained by multiplying the output value of the subtractor 161 by a tuning gain Kcmp, as the voltage correction value ΔVda for the d-axis component (i.e., the reference-voltage command value Vd*) of the reference-voltage command value. The multiplier 172 outputs a value obtained by multiplying the output value of the adder 162 by the tuning gain Kcmp, as the voltage correction value ΔVqa for the q-axis component (i.e., the reference-voltage command value Vq*) of the reference-voltage command value.

As a result, the voltage correction values ΔVda and ΔVqa for the reference-voltage command values for respectively compensating for the current deviations ΔId and ΔIq are represented by Equations (5) and (6):

$$\Delta Vda = Kcmp \times Kcc(\Delta Id - \Delta Iq/(s \times Tc)) \tag{5}$$

$$\Delta Vqa = Kcmp \times Kcc(\Delta Iq + \Delta Id/(s \times Tc)) \tag{6}$$

Referring, again, to FIG. 8, the adder 93 adds up the reference-voltage command value Vd* and the voltage correction value ΔVda to compute the d-axis component (i.e., a correction-voltage command value Vda*) of the correction-voltage command value. The adder 94 adds up the reference-voltage command value Vq* and the voltage correction value ΔVqa to compute the q-axis component (i.e., the correction-voltage command value Vqa*) of the correction-voltage command value.

Note that, in the example of FIG. 9, in the current suppressive control by the current suppression unit 92, d-q axis decoupling, in which the correction-value calculation unit 150 causes the current deviation ΔId to act on the voltage correction value ΔVqa and the current deviation ΔIq to act on the voltage correction value ΔVda, is performed by the integral control.

Figure 10:
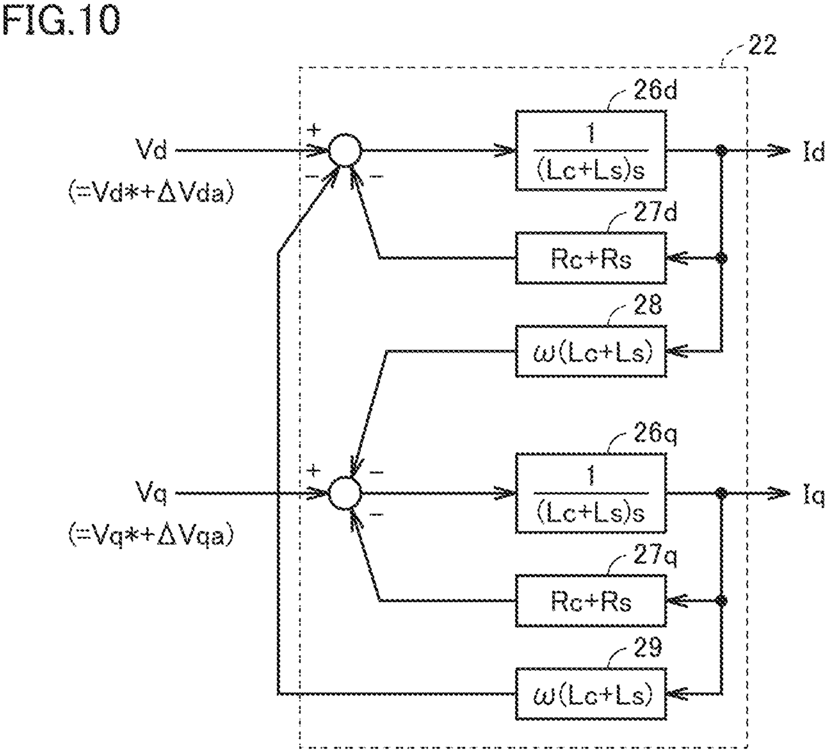
FIG. 10 is a block diagram illustrating transfer functions for a controlled target by a power conversion device according to Embodiment 3.

FIG. 10 is a block diagram illustrating transfer functions for a controlled target in a power conversion device according to Embodiment 3.

Referring to FIG. 10, transfer functions, for a controlled target 22, having the output voltage of the power converter 20 as an input and the AC current Isys detected by the AC current detector 6 as an output, are represented on the d-q coordinate axis. In other words, an input to the controlled target 22 is represented by the d-axis voltage Vd and the q-axis voltage Vq, which are obtained by three-phase-to-two-phase transformation on the output voltage of the power converter 20. The d-axis voltage Vd and the q-axis voltage Vq are controlled to the correction-voltage command value Vda* (=Vd*+ΔVda) and the correction-voltage command value Vq* (=Vq*+ΔVqa), respectively, shown in FIG. 8.

The output of the controlled target 22 is represented by the d-axis current Id and the q-axis current Iq that are obtained by the three-phase-to-two-phase transformation on the AC current Isys detected by the AC current detector 6. The d-axis current Id and the q-axis current Iq correspond to the output values of the coordinate transformation unit 110 of FIG. 9.

The controlled target 22 corresponds to a synthesis of the impedance of the power converter 20 and the impedance of the power system 2. Accordingly, a resistive component Rc and an inductance component Lc of the power converter 20, a resistive component Rs and an inductance component Ls of the power system 2, and an angular frequency ω of the output voltage (the AC voltage) of the power converter 20 on the d-q coordinate axis are used to define transfer functions 26*d*, 26*q*, 27*d*, 27*q*, 28, and 29 between the d-axis voltage Vd, the q-axis voltage Vq and the d-axis current Id, the q-axis current Iq.

The transfer functions 26*d* and 27*d* indicate interactions between the d-axis voltage Vd and the d-axis current Id. The transfer functions 26*q* and 27*q* indicate interactions between the q-axis voltage Vq and the q-axis current Iq. The interactions by the transfer functions 26*d* and 27*d* can be compensated for by a feedback control in which the correction-voltage command value Vda* is calculated using the current deviation ΔId. Similarly, the interactions by the transfer functions 26*q* and 27*q* can be compensated for by a feedback control in which the correction-voltage command value Vqa* is calculated using the current deviation ΔIq.

However, there are additionally the transfer function 28 in which the d-axis current Id acts on the q-axis voltage Vq and the transfer function 29 in which the q-axis current Iq acts on the d-axis voltage Vd, for the controlled target 22. Accordingly, the correction-value calculation unit 150 performs decoupling in which the current deviation ΔId on the d axis is reflected to the correction-voltage command value Vqa* and the current deviation ΔIq on the q axis is reflected to the correction-voltage command value Vda*.

The transfer functions 28 and 29, in contrast, include the inductance component Ls of the power system 2. While the inductance component Lc of the power converter 20 can be accurately estimated according to a circuit constant, it is difficult to accurately estimate the inductance component Ls because the inductance component Ls varies with conditions of the power system 2 (e.g., the load conditions, whether a ground fault accident has occurred or not, and the location of the ground fault accident, etc.).

Accordingly, as shown in FIG. 9, by calculating the voltage correction values ΔVda and ΔVqa, involving the decoupling by the integral control, in the correction-value calculation unit 150, the correction-voltage command values Vda* and Vqa* for compensating for and reducing the current deviations ΔId and ΔIq to zero can be set, even if the inductance component Ls of the power system 2 cannot be accurately estimated.

In contrast, if the inductance component Ls of the power system 2 can be accurately estimated, the decoupling control can also be implemented by a proportional control using control gains set according to the transfer functions 28 and 29, instead of the integral control. However, performing the decoupling control by the proportional control arouse a concern that an error in estimation of the inductance component Ls may destabilize the current suppressive effects by the current suppression unit 92. In Embodiment 3, in contrast, performing the decoupling control by the integral control can stabilize the current suppressive effects by the current suppression unit 92, without needing to estimate the inductance component Ls of the power system 2.

Advantageous Effects of Embodiment 3

According to Embodiment 3, the correction-voltage command values Vda* and Vqa* are generated by reflecting the correction values ΔVda and ΔVqa for compensating for the current deviations ΔId and ΔIq to the reference-voltage command values Vd* and Vq*. Furthermore, the current deviations ΔId and ΔIq reflect the negative-sequence-current command values Idn* and Iqn* generated by the negative-sequence current command calculation unit 91.

In the current command value generation unit 120, if the current amplitude Imag of the AC current Isys is less than or equal to the current limit value Imax (i.e., if the positive-sequence current of the AC current Isys is small), Id*=Id and Iq*=Iq are set, and ΔId=Idn* and ΔIq=Iqn*, therefore, result. Thus, the voltage correction values ΔVda and ΔVqa reflect the negative-sequence-current command values Idn* and Iqn*. The sum of the reference-voltage command value Vd*, and the voltage correction value ΔVda reflecting only the negative-sequence-current command value Idn* is set as the correction-voltage command value Vda*. The sum of the reference-voltage command value Vq*, and the voltage correction value ΔVqa reflecting only the negative-sequence-current command value Iqn* is set as the correction-voltage command value Vqa*. This allows the power converter 20 to suppress the negative-sequence current.

If the current amplitude Imag of the AC current Isys is greater than the current limit value Imax, in contrast, the current command values Id* and Iq* are set as command values for controlling the amplitude of the AC current Isys to equivalent to the current limit value Imax. As a result, the current deviations ΔId and ΔIq are set according to an exceeding amount of the current amplitude by the d-axis current Id and the q-axis current Iq, relative to the current limit value Imax. Furthermore, the current deviations ΔId and ΔIq reflect the negative-sequence-current command values Idn* and Iqn*. If the amplitude of the AC current Isys is greater than the current limit value Imax, the voltage correction values ΔVda and ΔVqa are calculated in the current suppression unit 92 so as to compensate for the current deviations ΔId and ΔIq, respectively. This allows the power converter 20 to suppress the positive-sequence current and the negative-sequence current.

From the above description, since the positive-sequence current and the negative-sequence current can be suppressed during the voltage imbalance, the protection shutdown of the power converter 20 due to the overcurrent can be prevented, thereby improving the operational continuity of the power converter 20.

Other Embodiments (1) In the example of FIG. 9 for Embodiment 3 described above, the configuration has been described in which the negative-sequence-current command values Idn* and Iqn* are always added to the d-axis current command value Id* and the q-axis current command value Iq*, respectively. However, the present disclosure is not limited to the configuration. For example, the negative-sequence-current command value Idn* may be added to the d-axis current command value Id* if the negative-sequence-current command value Idn* is greater than a specified value X1. The negative-sequence-current command value Iqn* may be added to the q-axis current command value Iq* if the negative-sequence-current command value Iqn* is greater than a specified value X2.

(2) The configurations exemplified as the above-described embodiments are one example configuration of the present disclosure, and can be combined with other known technique, or can be modified, such as part of the configuration being omitted, without departing from the gist of the present disclosure. Moreover, in the above-described embodiments, the processes and configurations described in the other embodiments may be appropriately adapted and implemented.

The presently disclosed embodiments should be considered in all aspects as illustrative and not restrictive. The scope of the present disclosure is indicated by the appended claims, rather than by the description above, and all changes that come within the scope of the claims and the meaning and range of equivalency of the claims are intended to be embraced within their scope.

REFERENCE SIGNS LIST

2 power system; 3 interconnection transformer; 4 arm; 5 arm reactor; 6 AC current detector; 7 AC voltage detector; 10 converter cell; 20 power converter; 22 controlled target; 26*d*, 26*q*, 27*d*, 27*q*, 28, 29 transfer function; 31 switching element; 32 capacitor; 33 voltage detector; 40 arm-current detector; 42, 43 filter; 52, 54 amplitude computing unit; 55 determination unit; 56 system-voltage control unit; 70 input converter; 71 sample and hold circuit; 72 multiplexer; 73 A/D converter; 74 CPU; 75 RAM; 76 ROM; 77 I/O interface; 78 auxiliary storage; 79 bus; 84 amplitude correction unit; 91 negative-sequence current command calculation unit; 92 current suppression unit; 100 control device; 120 current command value generation unit; 125 limiter; 130 deviation computing unit; 140 proportional control unit; 141, 142 proportioner; 150 correction-value calculation unit; 151, 152 integrator; 190 control computing unit; 200 power conversion device; 210 phase-balance control unit; 220 circulating-current control unit; 230 reference-voltage command generation unit; 240 correction-voltage generation unit; 250 voltage-command calculation unit; 260 gate-signal generation unit; and 1000 power conversion system.

The invention claimed is:

1. A power conversion device connected to a power system, the power conversion device comprising:

a power converter which includes at least one arm having a cascade-connected plurality of converter cells; and a control device to cause the power converter to operate as a voltage source, wherein each of the plurality of converter cells includes a plurality of switching elements and a power storage element connected to the plurality of switching elements, wherein the control device includes:

processing circuitry:

to generate arm-current command values for respective phases, based on direct-current voltages of power storage elements of the plurality of converter cells;

to generate a circulating-voltage command value for controlling a circulating current, based on the arm-current command values for respective phases;

to correct a reference-voltage command value for the power converter, using a correction value for suppressing an overcurrent due to a voltage imbalance of the power system, to generate a correction-voltage command value;

to generate arm-voltage command values for respective phases, based on the circulating-voltage command value and the correction-voltage command value; and to generate control signals for the plurality of switching elements of the plurality of converter cells of the at least one arm, according to the arm-voltage command values for respective phases, wherein the processing circuitry performs a filtering process, on an alternating-current voltage of the power system, for removing a positive sequence component from the alternating-current voltage, to compute the correction value, and adds the correction value to the reference-voltage command value to generate the correction-voltage command value.

2. The power conversion device according to claim 1, wherein the processing circuitry;

performs a coordinate transformation on the alternating-current voltage of the power system into a first d-axis voltage and a first q-axis voltage;

performs the filtering process on the first d-axis voltage to compute a second d-axis voltage as a d-axis component of the correction value, and performs the filtering process on the first q-axis voltage to compute a second q-axis voltage as a q-axis component of the correction value; and adds the second d-axis voltage to a d-axis component of the reference-voltage command value to generate a d-axis component of the correction-voltage command value, and adds the second q-axis voltage to a q-axis component of the reference-voltage command value to generate a q-axis component of the correction-voltage command value.

3. A power conversion device connected to a power system, the power conversion device comprising:

a power converter which includes at least one arm having a cascade-connected plurality of converter cells; and a control device to cause the power converter to operate as a voltage source, wherein each of the plurality of converter cells includes a plurality of switching elements and a power storage element connected to the plurality of switching elements, wherein the control device includes processing circuitry:

to generate arm-current command values for respective phases, based on direct-current voltages of power storage elements of the plurality of converter cells:

to generate a circulating-voltage command value for controlling a circulating current based on the arm-current command values for respective phases;

to correct a reference-voltage command value for the power converter, using a correction value for suppressing an overcurrent due to a voltage imbalance of the power system, to generate a correction-voltage command value;

to generate arm-voltage command values for respective phases, based on the circulating-voltage command value and the correction-voltage command value; and to generate control signals for the plurality of switching elements of the plurality of converter cells of the at least one arm, according to the arm-voltage command values for respective phases, wherein the processing circuitry computes, as the correction value, an amplitude correction value for correcting an amplitude of the reference-voltage command value, based on the alternating-current voltage of the power system, when no voltage imbalance is created in the power system, the processing circuitry adds the amplitude correction value to the amplitude of the reference-voltage command value to generate the correction-voltage command value, and when a voltage imbalance is created in the power system, the processing circuitry adds a value less than the amplitude correction value to the amplitude of the reference-voltage command value to generate the correction-voltage command value.

4. The power conversion device according to claim 3, wherein when a positive-sequence voltage of the power system has an amplitude less than a first threshold and a negative-sequence voltage of the power system has an amplitude greater than or equal to a second threshold, the processing circuitry determines that a voltage imbalance is being created in the power system.

5. The power conversion device according to claim 3, wherein the value less than the amplitude correction value is zero.

6. A power conversion device connected to a power system, the power conversion device comprising, a power converter which includes at least one arm having a cascade-connected plurality of converter cells; and a control device to cause the power converter to operate as a voltage source, wherein each of the plurality of converter cells includes a plurality of switching elements and a power storage element connected to the plurality of switching elements, wherein the control device includes processing circuitry:

to generate arm-current command values for respective phases, based on direct-current voltages of power storage elements of the plurality of converter cells:

to generate a circulating-voltage command value for controlling a circulating current, based on the arm-current command values for respective phases;

to correct a reference-voltage command value for the power converter, using a correction value for suppressing an overcurrent due to a voltage imbalance of the power system, to generate a correction-voltage command value;

to generate arm-voltage command values for respective phases, based on the circulating-voltage command value and the correction-voltage command value; and to generate control signals for the plurality of switching elements of the plurality of converter cells of the at least one arm, according to the arm-voltage command values for respective phases, wherein the processing circuitry;

computes a negative-sequence-current command value, based on the arm-current command values for respective phases;

computes, as the correction value, a voltage correction value for suppressing an output current from the power converter to be less than or equal to a current limit value, based on a detection value of the output current and the negative-sequence-current command value; and adds the voltage correction value to the reference-voltage command value to generate the correction-voltage command value.

7. The power conversion device according to claim 6, wherein the processing circuitry;

generates a d-axis current command value and a q-axis current command value, based on the current limit value, and a d-axis current and a q-axis current obtained by a coordinate transformation on the detection value;

computes a first current deviation between the d-axis current and a sum of the d-axis current command value and a d-axis component of the negative-sequence-current command value;

computes a second current deviation between the q-axis current and a sum of the q-axis current command value and a q-axis component of the negative-sequence-current command value;

computes, as a d-axis component of the voltage correction value, a first correction value for compensating for the first current deviation, and computes, as a q-axis component of the voltage correction value, a second correction value for compensating for the second current deviation; and computes a d-axis component of the correction-voltage command value, based on the first correction value and a d-axis component of the reference-voltage command value, and computes a q-axis component of the correction-voltage command value, based on the second correction value and a q-axis component of the reference-voltage command value.

8. The power conversion device according to claim 4, wherein the value less than the amplitude correction value is zero.

* * * * *